United States Patent
Krawczyk et al.

(10) Patent No.: US 11,731,115 B2
(45) Date of Patent: Aug. 22, 2023

(54) INHIBITORS OF HYDROSILYLATION CATALYSTS

(71) Applicant: Joanneum Research Forschungsgesellschaft mbH, Graz (AT)

(72) Inventors: Krzysztof Krawczyk, Weiz (AT); Paul Patter, Lassnitzhöhe (AT)

(73) Assignee: Joanneum Research Forschungsgesellschaft mbH, Graz (AT)

( * ) Notice: Subject to any disclaimer, the term of this patent is extended or adjusted under 35 U.S.C. 154(b) by 0 days.

(21) Appl. No.: 17/714,624

(22) Filed: Apr. 6, 2022

(65) Prior Publication Data
US 2022/0323945 A1     Oct. 13, 2022

(30) Foreign Application Priority Data

Apr. 12, 2021   (EP) .................. 21167848

(51) Int. Cl.
| | | |
|---|---|---|
| B01J 31/16 | (2006.01) | |
| B01J 31/22 | (2006.01) | |
| C08G 77/12 | (2006.01) | |
| C09D 11/38 | (2014.01) | |

(52) U.S. Cl.
CPC .......... *B01J 31/1608* (2013.01); *B01J 31/22* (2013.01); *B01J 31/2204* (2013.01); *C08G 77/12* (2013.01); *C09D 11/38* (2013.01); *B01J 2231/323* (2013.01); *B01J 2531/828* (2013.01)

(58) Field of Classification Search
CPC ... B01J 31/1608; B01J 31/2204; C09D 11/38; C08G 77/12; C08G 77/20
See application file for complete search history.

(56) References Cited

U.S. PATENT DOCUMENTS

| | | | |
|---|---|---|---|
| 3,814,730 A | | 6/1974 | Karstedt |
| 5,248,715 A | | 9/1993 | Gray et al. |
| 5,405,929 A | | 4/1995 | Kobayashi |
| 5,756,209 A | * | 5/1998 | Hale .................. G02B 6/03694 |
| | | | 428/375 |
| 2019/0367744 A1 | | 12/2019 | Chevalier et al. |

OTHER PUBLICATIONS

European Patent Office, Extended European Search Report dated Oct. 12, 2021, for corresponding European Patent Application No. 21167848.7.
Mikkonen et al., Inkjet Printable Polydimethylsiloxane for All-Inkjet-Printed Multilayered Soft Electrical Applications, ACS Publications, 2020 American Chemical Society; https://dx.doi.org/10.1021/acsami.9b19632 ACS Appl. Mater. Interfaces 2020, 12, 11990-11997.
Sturgess et al., 3D reactive inkjet printing of polydimethylsiloxane, Journal of Materials Chemistry C, Royal Society of Chemistry, J. Mater. Chem. C, 2017, 5, 9733-9743.

* cited by examiner

*Primary Examiner* — Caixia Lu
(74) *Attorney, Agent, or Firm* — Duane Morris LLP

(57) ABSTRACT

A composition containing the following components:
(a) a hydrosilylation catalyst comprising a metal-ligand complex, and
(b) an inhibitor of the catalyst, wherein the inhibitor differs from the ligand of the metal-ligand complex and is represented by formula (I):

$$X-CHR-CO-Y \qquad (I),$$

wherein —X represents —$NO_2$, —S(=O)R, or $R^c{}_2R^aC$—CO—; Y represents 2-furyl, —S(=O)R, —CN, —$NO_2$, or —$CR^b{}_x R^d{}_{3-x}$; $R^a$ and $R^b$ is independently selected from the group consisting of —O—R, —O—CO—R, —CO—O—R, 2-furyl, —S(=O)R, —CN, —$NO_2$, —F, —Cl, and —Br; each of R is independently selected from the group consisting of —H, optionally fluorinated $C_1$-$C_8$-alkyl, —F, —Cl, and —Br; each of $R^c$ and each of $R^d$ is independently selected from the group consisting of —H, optionally fluorinated $C_1$-$C_8$-alkyl, —F, —Cl, and —Br; and x is 0 or 1.

10 Claims, 1 Drawing Sheet

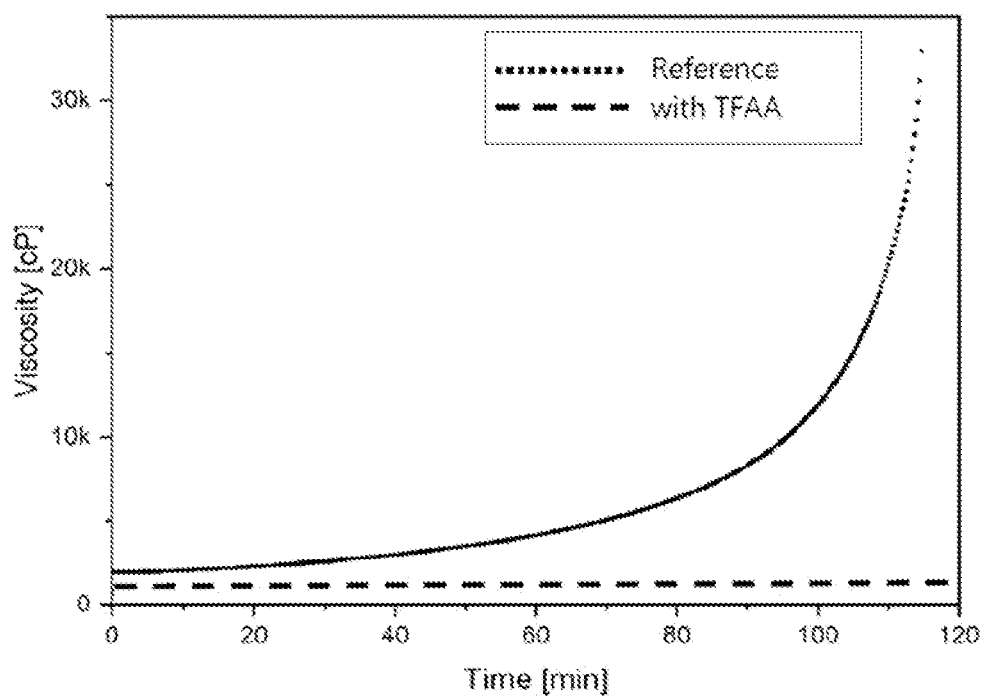

INHIBITORS OF HYDROSILYLATION CATALYSTS

FIELD OF THE INVENTION

The present invention relates to the use of novel inhibitors of hydrosilylation catalysts, a composition containing the catalyst and the inhibitor, and a process of carrying out a hydrosilylation reaction using the catalyst and the inhibitor.

BACKGROUND ART

Organoplatinum catalysts such as Karstedt's catalyst (adduct of e.g. divinyltetramethyldisiloxane and chloroplatinic acid) are used to catalyse hydrosilylation reactions, e.g. to obtain crosslinked polydimethylsiloxane (PDMS). Usually, the composition for reaction is premixed before the application of the catalyst. The high activity of the platinum catalysts reduces the pot life of the composition. A pot life of several hours at room temperature is long enough for applications in which the composition is casted or screen-printed. However, other applications of the composition require longer pot lives, such as applications in inkjet printing disclosed in Sturgess et al. ("*3D reactive inkjet printing of polydimethylsiloxane*", J. Mater. Chem. C, 2017, 5, 9733-9743) and Mikkonen et al. ("*Inkjet Printable Polydimethylsiloxone for All-Inkjet-Printed Multilayered Soft Electrical Applications*" ACS Appl. Mater. Interfaces 2020, 12, 10, 11990-11997). To extend the pot life of a composition used for inkjet printing, it may be stored refrigerated immediately after transferring it to the printing cartridge. A refrigerated ink may be useful for several days. Another approach of reducing the viscosity of an inkjet printable composition thereby extending the pot life is to add a solvent. A known solvent is octyl acetate (OA), which is miscible with PDMS and offers a suitable vapour pressure for printing. The addition of OA dilutes the components and thus extends the pot life of the formulation.

Problem to be Solved by the Invention

The content of the solvent as a modifier of the viscosity and an extender of the pot life should not be too high in an inkjet printable formulation. Therefore, the pot life of an inkjet printable formulation is limited to a maximum of a few hours. This poses significant practical and technological limitations for the application in inkjet printing. The pot life and the viscosity of the formulation are also problems in applications in which no solvent is used in the formulation, e.g. in methods for producing LEDs comprising a step of syringe dispensing the formulation.

Therefore, the problem underlying the present invention was to provide an effective and reversible inhibitor of hydrosilylation catalyst to extend the pot life of a hydrosilylation reaction mixture.

SUMMARY OF THE INVENTION

The problem underlying the present invention was solved by providing a composition containing an inhibitor of a hydrosilylation catalyst, wherein the inhibition is effective and based on a reversible interaction.

The present application covers the following points [1] to [15].

[1] A composition containing the following components:
(a) a hydrosilylation catalyst comprising a metal-ligand complex, and
(b) an inhibitor of the catalyst, wherein the inhibitor differs from the ligand of the metal-ligand complex and is represented by formula (I):

$$X\text{—}CHR\text{—}CO\text{—}Y \qquad (I),$$

wherein —X represents —$NO_2$, —S(=O)R, or —$R^c_2R^aC$—CO—; Y represents 2-furyl, —S(=O)R, —CN, —$NO_2$ or —$CR^b_xR^d_{3-x}$; $R^a$ and $R^b$ is independently selected from the group consisting of —O—R, —O—CO—R, —CO—O—R, 2-furyl, —S(=O)R, —CN, —$NO_2$, —F, —Cl, and —Br; each of R is independently selected from the group consisting of —H, optionally fluorinated $C_1$-$C_8$-alkyl, —F, —Cl, and —Br; each of $R^c$ and each of $R^d$ is independently selected from the group consisting of —H, optionally fluorinated $C_1$-$C_8$-alkyl, —F, —Cl, and —Br; and x is 0 or 1.

[2] The composition according to [1], wherein the inhibitor (b) is represented by formula (II): $R^c_2R^aC$—CO—CHR—CO—Y (II), wherein the groups are as defined in [1].

[3] The composition according to [1], wherein the inhibitor (b) is represented by formula (III): $R^c_2R^aC$—CO—CHR—CO—$CR^b_xR^d_{3-x}$ (III), wherein the groups are as defined in [1].

[3-1] In a preferred embodiment of any one of [1] to [3] above, the concentration of the inhibitor in the composition is higher than the concentration of the ligand of the metal-ligand complex. [3-2] In another preferred embodiment of any one of [1] to [3] above, the ligand of the metal-ligand complex is not a compound falling within the respective definition of the inhibitor (b). [3-3] In another preferred embodiment of any one of [1] to [3] above, the boiling point of the ligand of the metal-ligand complex is higher than the boiling point of the inhibitor (b). [3-4] A combination of the features of [3-1] and [3-2] is more preferred. [3-5] A combination of the features of [3-1] and [3-3] is more preferred. [3-6] A combination of the features of [3-2] and [3-3] is more preferred. [3-7] A combination of the features of [3-1], [3-2] and [3-3] is most preferred.

[4] The composition according to any one of points [1] to [3-5], containing the following components:
(a) a hydrosilylation catalyst comprising platinum(0) and olefinic ligands, and
(b) an inhibitor represented by formula (I), (II), or (III) as defined in any one of [1] to [3-5].
The inhibitor of formula (III) is preferred.

[5] The composition according to any of the preceding points, wherein at least one of —$CR^aR^c_2$ and —$CR^c_xR^d_{3-x}$ is —$CF_3$.

[6] The composition according to any of the preceding points, containing the following components: (c) a sil(ox)ane having an olefinic group and (d) a sil(ox)ane containing hydrogen directly bonded to silicon.

[7] The composition according to any of the preceding points, containing the following components: (c) a vinyl-containing polysiloxane and (d) a polysiloxane containing hydrogen directly bonded to silicon.

[8] The composition according to any of the preceding points, wherein the hydrosilylation catalyst is a complex of platinum(0) and a divinyl-containing disiloxane.

[9] The composition according to any of the preceding points, wherein the weight ratio of components (b):((c)+(d)) is 3:100 to 20:100.

[10] The composition according to any of the preceding points, containing, as component (e), a solvent that does not fall within the definition of any of components (a) to (d).

[11] A two-package hydrosilylation system, wherein a first package comprises a sil(ox)ane containing hydrogen directly bonded to silicon and a second package comprises the composition of any one of points [1] to [5] and a sil(ox)ane having an olefinic group; or wherein a first package comprises the composition of any one of points [1] to [5] and a sil(ox)ane containing hydrogen directly bonded to silicon and a second package comprises a sil(ox)ane having an olefinic group.

[12] A process of hydrosilylation comprising the steps of
(i) providing a reaction system containing the following components:
  (a) a hydrosilylation catalyst comprising a metal-ligand complex, and
  (b) an inhibitor of the catalyst, wherein the inhibitor differs from the ligand of the metal-ligand complex and is represented by formula (I), (II), or (III):

$$\text{X—CHR—CO—Y} \tag{I}$$

wherein —X represents —$NO_2$, —S(=O)R, or $R^c{}_2R^aC$—CO—; Y represents 2-furyl, —S(=O)R, —CN, —$NO_2$, or —$CR^b{}_xR^d{}_{3-x}$; $R^a$ and $R^b$ is independently selected from the group consisting of —O—R, —O—CO—R, —CO—O—R, 2-furyl, —S(=O)R, —CN, —$NO_2$, —F, —Cl, and —Br; each of R is independently selected from the group consisting of —H, optionally fluorinated $C_1$-$C_8$-alkyl, —F, —Cl, and —Br; each of $R^c$ and each of $R^d$ is independently selected from the group consisting of —H, optionally fluorinated $C_1$-$C_8$-alkyl, —F, —Cl, and —Br; and x is 0 or 1, $$R^c{}_2R^aC\text{—CO—CHR—CO—Y} \tag{II}$$

wherein the groups are as defined in relation to formula (I), $$R^c{}_2R^aC\text{—CO—CHR—CO—}CR^b{}_xR^d{}_{3-x} \tag{III}$$

wherein the groups are as defined in relation to formula (I),
  (c) a sil(ox)ane having an olefinic group, and
  (d) a sil(ox)ane containing hydrogen directly bonded to silicon;
(ii) carrying out a hydrosilylation reaction to crosslink components (c) and (d);
(iii) at least partly removing the inhibitor from the reaction system.

The hydrosilylation reaction in step (ii) may be started and/or accelerated by step (iii).

[12-1] In an embodiment of [12], the inhibitor is not fully removed from the reaction system in step (iii).

[13] A crosslinked product obtainable by the method of [12].
[13-1] In an embodiment of the invention, the crosslinked product of [13] contains the inhibitor not fully removed in step (iii) of the process of [12] or [12-1]. In other words, [13-1] relates to a composition containing the crosslinked product and the inhibitor. [13-2] In a preferred embodiment of [13-1], the concentration of the inhibitor in the crosslinked product, i.e. the composition, is 0.0000001 to 5 wt %, preferably 0.000001 to 1 wt %, more preferably 0.0001 to 1 wt %, and most preferably 0.0001 to 0.1 wt %.

[14] The use of a compound of the following formula (I) or (II) or (III) as an inhibitor of a hydrosilylation reaction employing a catalyst which comprises a metal-ligand complex, wherein the inhibitor differs from the ligand of the metal-ligand complex:

$$\text{X—CHR—CO—Y} \tag{I}$$

wherein —X represents —$NO_2$, —S(=O)R, or $R^c{}_2R^aC$—CO—; Y represents 2-furyl, —S(=O)R, —CN, —$NO_2$, or —$CR^b{}_xR^d{}_{3-x}$; $R^a$ and $R^b$ is independently selected from the group consisting of —O—R, —O—CO—R, —CO—O—R, 2-furyl, —S(=O)R, —CN, —$NO_2$, —F, —Cl, and —Br; each of R is independently selected from the group consisting of —H, optionally fluorinated $C_1$-$C_8$-alkyl, —F, —Cl, and —Br; each of $R^c$ and each of $R^d$ is independently selected from the group consisting of —H, optionally fluorinated $C_1$-$C_8$-alkyl, —F, —Cl, and —Br; and x is 0 or 1;

$$R^c{}_2R^aC\text{—CO—CHR—CO—Y} \tag{II}$$

wherein the groups are as defined for formula (I);

$$R^c{}_2R^aC\text{—CO—CHR—CO—}CR^b{}_xR^d{}_{3-x} \tag{III}$$

wherein the groups are as defined for formula (I).

[15] The use according to [14], wherein the hydrosilylation reaction is carried out in an inkjet-printed composition or in a syringe-dispensed composition.

Advantages of the Invention

The inhibitor is effective and not acutely toxic. The addition of small amounts of the inhibitor extends the shelf-life of a composition or a one-component polymer system containing a catalyst and extends the pot-life of a two-component polymer system containing a catalyst after mixing the components.

The inhibitor can be used e.g. in inkjet printable compositions and can be easily adapted for other printing techniques such as aerosol-jet and screen-printing. Hence, a series of novel and innovative manufacturing possibilities in the field of 2D and 3D printing are possible.

DESCRIPTION OF THE DRAWINGS

FIG. 1 shows the viscosity of a PDMS resin (Sylgard 184; PDMS base:curing agent=10:1 wt/wt) versus the same resin with 15 wt % of 1,1,1-trifluoroacetylacetone (TFAA) at 40° C. over a time period of 120 minutes (Example 5).

EMBODIMENTS OF THE INVENTION

As used herein, the singular forms "a," "an," and "the" may be intended to include the plural forms as well, unless the context clearly indicates otherwise. For instance, structural elements and components are generally described in the singular form, such as "an" inhibitor or "containing a" component. Such singular form formulations are meant to include more than one of the indicated component or structural element, unless indicated otherwise. The term "and/or" includes any and all combinations of one or more of the associated listed items. The verbs "contain," "comprise," and "have" are inclusive and therefore specify the presence of stated features, steps, elements, and/or components, but do not preclude the presence or addition of one or more other features, steps, elements, components, and/or groups thereof. The method steps and processes described herein are not to be construed as necessarily requiring their performance in the particular order discussed or illustrated, unless specifically identified as an order of performance. As used herein, the term "sil(ox)ane" is intended to be equivalent to the term "(poly)silane and/or (poly)siloxane", wherein "poly" means a polymerization degree of two or more.

The inhibitor used in the present invention inhibits the activity of a catalyst employed in a hydrosilylation reaction.

A hydrosilylation reaction crosslinks an olefinic group-containing and a hydrogen-containing silicon compound. The groups to be crosslinked may be contained in the same molecule (one-component system) or may be contained in separate molecules (two-component system), such as polymethylhydrosiloxane and polymethylvinylsiloxane. The reaction may be induced thermally or by exposure to UV light. The crosslinked, i.e. cured, reaction product will herein be referred to as "the silicone elastomer". The degree of crosslinking is not limited and may be high such that the silicone is no longer an elastomeric polymer, but a hard-cured polymer.

The organoplatinum catalyst that may be used in the present invention is a Karstedt catalyst (simply referred to as "the catalyst" in the following), as disclosed in U.S. Pat. No. 3,814,730. The catalyst contains platinum which is in the zero-oxidation state with no co-ordinated chlorides. The catalyst contains complexes of Pt(0) with olefinic groups in the absence of the inhibitor. Preferably, the olefinic ligands of the catalyst are the olefinic groups of silanes and/or siloxanes employed as the reaction components in the hydrosilylation reaction. More preferably, the olefinic ligands are the olefinic groups of polyorganosiloxanes comprising, per molecule, at least two olefinic groups directly bonded to silicon atoms. A specific example is polymethyldivinylsiloxane, preferably divinyl-containing disiloxane. The catalyst promotes a low-temperature hydrosilylation reaction and forms silicone elastomers through an addition crosslinking reaction between Si-vinyl and Si—H groups.

The inhibitor used in accordance with the present invention or contained in a composition or a two-package hydrosilylation system of the present invention is an inhibitor of formula (I), (II), or (III) and will be simply referred to as "the inhibitor" in the following. The inhibitor reversibly interacts with the catalyst.

The composition of the present invention contains (a) a hydrosilylation catalyst comprising a metal-ligand complex and (b) an inhibitor of the catalyst of formula (I), (II), or (Ill). The metal-ligand complex of component (a) comprises a metal and at least one ligand. Hence, the composition of the present invention contains at least three components, i.e. a metal, a ligand and an inhibitor. The ligand in the metal-ligand complex of the catalyst differs from the inhibitor of component (b). Preferably, the ligand is not a compound of formula (I), (II), or (III). The ligand and the inhibitor differ in their catalytic ability when combined with the metal. This means that a composition of the metal and the ligand, which may form a metal-ligand complex of component (a), has a higher activity as a hydrosilylation catalyst than a composition of the metal and the inhibitor. Hence, the catalytic activity of a composition containing the metal, the ligand and the inhibitor can be increased by removing the inhibitor and/or adding the ligand and can be decreased by removing the ligand and/or adding the inhibitor. In this way, the ligand and the inhibitor can be clearly identified and distinguished in a composition. Another difference between the ligand and the inhibitor is the higher boiling point of the ligand. Due to this difference, the inhibitor can be selectively removed by increasing the temperature and the hydrosilylation reaction can thus be easily accelerated.

As explained below, a structural feature of the inhibitor is the negative inductive effect of the substituent $R^a$ and optionally of the substituents $R^b$ to $R^d$. Preferably, $R^a$ is a halogen atom selected from fluoro, chloro and bromo. More preferably, $R^a$ and at least one of $R^c$ is a halogen atom. Most preferably, $R^a$ and $R_c$ together represent two or three halogen atoms and the other groups represented by $R^c$, $R^b$, and $R^d$ represent hydrogen. Particularly preferred compounds are $HF_2C$—CO—$CH_2$—CO—$CH_3$, $F_3C$—CO—$CH_2$—CO—$CH_3$, $HF_2C$—CO—$CH_2$—CO—$CF_3$, $F_3C$—CO—$CH_2$—CO—$CF_3$, $Cl_3C$—CO—$CH_2$—CO—$CH_3$, and $Cl_3C$—CO—$CH_2$—CO—$CCl_3$.

The inhibitor is a compound of formula (I), (II), or (III), i.e. a 1,3-diketone (acetylacetone derivative) or a compound similar to a 1,3-diketone. 1,3-Diketones that can tautomerize to an enol that is conjugated to the other carbonyl usually exist predominantly in the enol form, and especially when the product can be further stabilized by a six-membered ring containing a hydrogen bond. For example, the percent enol in acetylacetone, 1,1,1-trifluoroacetylacetone (TFAA), and hexafluoroacetylacetone are 85, 97, and 100%, respectively. 1,3-diketones and metals can form metal acetylacetonate coordination complexes. Hexafluoroacetylacetonates and trifluoroacetylacetonates form complexes that are often structurally related to regular acetylacetonates but are more Lewis acidic and more volatile. Therefore, they are not only more effective as inhibitors but are also more easily removable by evaporation. Example 3 shows that acetylacetone is not effective as an inhibitor.

Without the wish to be bound by theory, the inventors suppose that the inhibitor affects the activity of the catalyst employed in a type of "allosteric" control. The inhibitor is supposed to have the potential to complex the active metal of the catalyst. The negative inductive effect of the substituents such as the trifluoro group renders the inhibitor more Lewis acidic. Since the complexes are not too strong, a chemical equilibrium can be maintained between the complex and the free ligand. Example 4 shows that the inhibition of the catalyst is completely reversible. When the inhibitor is removed from the composition, e.g. by evaporation, the catalyst returns to its pristine active form and the crosslinking proceeds normally.

Amines and other compounds, which are able to complex the active metal-centre of the catalyst may inhibit the crosslinking in a similar fashion as the inhibitor used in the present invention. However, the inhibition with amines was found to be irreversible or only partially reversible. It is assumed that this is due to the formation of stable complexes between the amine (base) and the metal centre (which has an acidic character). Example 4 shows that the inhibition of the catalyst by primary and secondary amines is irreversible even at temperatures exceeding the boiling points of these amines. For tertiary amines, very limited reversibility is observed so that crosslinking is hindered, resulting in a very soft, not completely cured silicone elastomer. In addition, in the case of tertiary amines, the required curing time is too long for useful practical applications. Further, most primary, secondary, and tertiary amines are acutely poisonous and produce toxic vapours.

The inhibitor may have a boiling point of less than 120° C. For instance, TFAA and hexafluoroacetylacetone have boiling points of 105-107° C. and 70-71° C., respectively. In comparison, acetylacetone and OA have boiling points of 140° C. and 211° C., respectively. The reaction catalysed by e.g. the organoplatinum catalyst may be accelerated by removing the inhibitor by evaporation at elevated temperatures and/or reduced pressure.

An organoplatinum catalyst is preferably utilized in amounts of at least 0.1 ppm of platinum metal and more preferably 1 to 50 ppm of platinum metal per 100 parts of the olefinic group-containing compound. The hydrogen-containing crosslinking agent is preferably utilized in amounts of 1 to 50 parts and more preferably from 1 to 25 parts per 100 parts of the olefinic group-containing compound.

The amount of inhibitor compound that is added to the composition will vary in accordance with a particular application of the composition. Preferably, the concentration of the inhibitor in the composition is higher than the concentration of the ligand of the metal-ligand complex, or the concentration of the inhibitor in the composition is higher than the concentration of the metal of the metal-ligand complex. More preferably, the concentration of the inhibitor may by more than five times or more than ten times or more than 100 times higher than the concentration of the metal of the metal-ligand complex. The higher the level of the inhibitor that is present, the longer the composition will be shelf stable for a one-component system and the longer the composition will have a pot life if it is a two-component system. For most applications, the concentration of the inhibitor may be 0.01 to 200 parts by weight, preferably 0.01 to 10 parts by weight per 100 parts of the base olefinic-containing compound.

The composition of the present invention may contain a one-component polymer system comprising a catalyst and the inhibitor, or the composition may contain the catalyst, the inhibitor and one component of a two-component polymer system, such as the vinyl component of a PDMS system. In both cases, the inhibitor extends the shelf-life of the composition. After mixing the components of a two-component polymer system such as a PDMS system, the inhibitor extends the pot-life of the system.

In the two-package hydrosilylation system of the present invention, the reactive components of a two-component polymer system are packaged separately. This means the olefinic group-containing polymer such as the vinyl-containing polymer is packaged separately from the hydride crosslinking agent. The inhibitor may be packaged either with the olefinic group-containing compound or it may be packaged with the hydride crosslinking agent. The catalyst is preferably compounded or mixed in with the olefinic group-containing polymer. In most cases it is preferred to mix the inhibitor along with the catalyst in the olefinic group-containing compound.

The composition can also be a one-package system, that is, where all the ingredients are mixed together and the composition is utilized by simply heating at elevated temperatures to create the cured silicone elastomer by evaporating the inhibitor. In the case of a one-package system, the amount of the inhibitor may be more than 15 parts per 100 parts of the olefinic group-containing compound to extend the shelf-life of the composition.

The olefinic group-containing compound such as vinyl-containing polysiloxane is preferably of low viscosity and acts both as a diluent and as a reinforcing agent for the final cure of the elastomer. The olefinic group-containing compound may be a polymer or a blend of olefinic group-containing polymers and more specifically a blend of the olefinic group-containing polymer with other olefinic group-containing polymers having olefinic units, e.g. vinyl units, both on the terminal position as well as the internal positions of the polymer chain such as the polysiloxane chain. The hydrogen-containing crosslinking agent may be anyone that is normally utilized in hydrosilylation reactions to form silicone elastomers and may be a hydrogen-containing polysiloxane of a viscosity of preferably 1 to 10,000 mPa·s at 25° C. In addition, various other additives may be added to the composition such as, fillers and pigments, heat-aging additives and other types of additional ingredients normally associated with the fabrication of such compositions.

The vinyl-containing polysiloxane preferably contains from 0.01 to 1 mole percent vinyl. Preferably, the polymer is linear and preferably the vinyl is at the terminal positions of the linear polymer chain. However, the vinyl groups can be on any part of the polymer chain. The polymer can be a single polymer species or it can be a blend of vinyl containing polymer materials. The other substituent groups in addition to the vinyl radical can be any monovalent hydrocarbon radicals or halogenated monovalent hydrocarbon radicals, preferably not exceeding 10 carbon atoms. Most preferably, the substituent group bound to silicon is selected from lower alkyl radicals of 1 to 8 carbon atoms, vinyl radicals and phenyl radicals. The most preferred polymer species within the scope of the vinyl-containing polymer is a strictly linear polymer with vinyl radical terminal units.

An example of a two-component silicone elastomer system is Polytek PlatSil® 71-Silliglass containing silicone hydride and part of the vinyl-containing silicone in PDMS A and part of the vinyl-containing silicone and the catalyst in PDMS B (Sturgess et al.). The inhibitor used in the present invention can be added to any component corresponding to PDMS A or PDMS B disclosed in Sturgess et al.

Another example of a two-component silicone elastomer system is SYLGARD® 184 containing polymeric base and a curing agent which crosslinks with the polymeric matrix. The resulting composite formed is a polydimethylsiloxane (PDMS) with a tensile strength (UTS) of about 5.2 MPa and shore hardness of about 44 at room temperature. The tensile strength, hardness, and the young's modulus (E) increase at a higher curing temperature. The pot life is 1.5 hours at 25° C. and is defined as the time required for the viscosity to double after base and curing agent are mixed. The initial viscosity of the mixture is 3500 Pa·s. The cure time depends on the temperature and is 48 hours at 25° C., 35 minutes (100° C.), 20 minutes (125° C.), 10 minutes (150° C.). As shown in Example 5, the increase in viscosity can be inhibited over a long period of time. Hence, the pot life of the composition can be extended.

The inhibitor cannot be fully removed from the hydrosilylation reaction system by increasing the temperature to or above the boiling point of the inhibitor. As a result, the reaction product of the hydrosilylation reaction inevitably contains detectable amounts of the inhibitor, which can be quantitatively detected by methods such as GC-MS. Hence, the reaction product prepared by using the inhibitor of the present invention differs from a reaction product not prepared by using such an inhibitor. In other words, the crosslinked product according to the present invention differs from prior art products.

GC-MS is an extremely sensitive method and easily detects concentrations in the range of ppb (parts per billion), i.e. concentrations of as low as 0.0000001 wt %, or even lower.

The inhibitor is present in diluted form in the reaction system. The interaction with the diluent, e.g. a solvent has the effect that the inhibitor cannot be fully removed by increasing the temperature to the boiling point of the inhibitor. The inventors could demonstrate in experiments that a solution containing 5 wt % of TFAA having a boiling point of 107° C. still contained a significant amount of TFAA after heating at 120° C. for a longer period of time, e. g. one hour.

A hydrosilylation system contains the raw materials for the polymerization, the catalyst and the inhibitor. The inhibitor and the other components of the reaction system physically interact. In particular, it can be assumed that the inhibitor is capable of forming a complex with the metal of the catalyst. For this reason, it is impossible to completely remove the inhibitor by heating and a residual amount of inhibitor will always be contained in the reaction product when employing typical reaction conditions. This residual amount can be detected by methods such as GC-MS. If necessary, the low-molecular inhibitor can be extracted from the high-molecular polymerization product before CG-MS is carried out. A silicone elastomer system such as PDMS can be used as a stamp resin in soft-lithography for a variety of applications such as microfluidics, microelectromechanical systems (MEMS) and other flexible electronic devices. It also forms hydrophobic PDMS films which can be used as moisture membrane in photovoltaic cells. Moreover, due to its low cost, easy fabrication, flexibility, and optical transparency, PDMS is material of choice for prototype fabrication in manifold research and development areas.

A possible use of PDMS is in inkjet printing. The use of PDMS systems in inkjet printing, the materials and methods, and the applications of inkjet printed PDMS systems are described in detail in Mikkonen et al. and Sturgess et al.

The use in inkjet printing requires the addition of a solvent to reduce the viscosity. On the other hand, the solvent should have a low boiling point to be removable after printing. In the present invention, the solvent (component (e)) has a molecular weight of less than 250 g/mol and a boiling point of less than 250° C. The solvent does not fall within the definition of any of components (a) to (d). In particular, the solvent does not contain the metal of the catalyst, it is no compound of formula (I), (II) or (III), and it is no silane or siloxane. Examples of suitable solvents are organic solvents such as octyl acetate (OA), n-butyl or isobutyl acetate or acetylacetone.

Mikkonen et al. discloses the use of OA as a solvent. Because the two components of Sylgard 184 were mixed in advance to the printing, it was necessary to keep the cartridge temperature as low as possible, thus hindering the crosslinking of the PDMS component. The 1:2 PDMS-OA solution was too viscous and required heating the cartridge to temperatures above 35° C. However, heating accelerates crosslinking. Both the 1:3 and 1:4 PDMS-OA solutions could be printed without heating the cartridge above 30° C. To maximize the PDMS-content of the ink, a 1:3 PDMS-OA solution was used.

As shown in FIG. 1, the inhibitor used in the present invention not only inhibits the increase in viscosity over time but also has the effect of reducing the viscosity at the beginning. Therefore, the inhibitor may at least partly replace component (e) in its function as a solvent employed to adjust the viscosity of the composition for the use in inkjet printing.

EXAMPLES

In the following Examples, ratios of components are weight ratios, percentages are weight percentages. The PDMS used in the Examples was a premixture of the two components of SYLGARD™ 184 (PDMS base:curing agent=10:1). 1,1,1-trifluoroacetylacetone (TFAA) was used as the inhibitor.

Example 1

PDMS was diluted with OA at a ratio of 1:2, as described in Mikkonen et al. Further, TFAA was added in different concentrations:

PDMS+OA(1:2)+TFAA(1.5% to 90% related to PDMS)

The containers were sealed and stored at 80° C. for 48 hours. As a result, concentrations up to 6% (related to PDMS) cured successfully, while curing was successfully inhibited in the increasing concentrations of 15% (related to PDMS) or more.

Example 2

PDMS was diluted with OA (1:2) as described in Example 1. Intermediate concentrations (6%, 9% and 12%, each related to PDMS) were included, showing that the minimum concentration to inhibit curing is between 9% and 12%.

Example 3

PDMS was diluted with OA (1:2) as described in Example 1, and acetylacetone was added in different concentrations:

PDMS+OA(1:2)+acetylacetone(3% to 30% related to PDMS)

Acetylacetone turned out to be ineffective in any of the used concentrations.

Example 4

In a preliminary experiment, propylamine, pyrrolidine and triethylamine as examples of primary, secondary, and tertiary amines, respectively, were tested at a concentration of 15% each, and all of them successfully inhibited crosslinking.

Next, the reversibility of successful inhibition was tested. Open containers were placed in the oven for 24 hours at 60° C. to evaporate the additives. Reversibility was observed for all TFAA mixtures, i.e. crosslinking occurred upon evaporation of TFAA. Higher concentrations of TFAA resulted in softer surfaces, indicating not completely cured elastomer. Conversely, no reversibility was observed for propylamine, pyrrolidine and triethylamine. The crosslinking was hindered, and the material remained liquid.

Next, higher temperatures and vacuum were used to accelerate the evaporation of additives and to show a potential reversibility of the inhibition. 72 hours at 80° C. and 100 mbar showed that inhibition is completely reversible also for higher TFAA concentrations. For propylamine and pyrrolidine, the experiments showed a complete irreversible reaction and the material remained liquid. For Triethylamine, very limited reversibility was observed so that crosslinking was hindered, resulting in a very "sticky", not completely cured elastomer.

Example 5

Non-diluted PDMS was compared to non-diluted PDMS with TFAA (15%) within a prolonged rheology measurement, showing the progress of crosslinking over time. FIG. 1 shows the viscosity of PDMS versus the same resin with 15% of TFAA at 40° C., over 120 minutes.

What is claimed is:

1. A composition containing the following components:
   (a) a hydrosilylation catalyst comprising a metal-ligand complex, and
   (b) an inhibitor of the catalyst, wherein the inhibitor differs from the ligand of the metal-ligand complex and is represented by formula (I):

X—CHR—CO—Y     (I), wherein —X represents —$NO_2$, —S(=O)R, or —$R^c_2R^aC$—CO—; Y represents 2-furyl, —S(=O)R, —CN, —$NO_2$, or —$CR^b_xR^d_{3-x}$; $R^a$ and $R^b$ are independently selected from the group consisting of —O—R, —O—CO—R, —CO—O—R, 2-furyl, —S(=O)R, —CN, —NO$_2$, —F, —Cl, and —Br; each of R is independently selected from the group consisting of —H, optionally fluorinated C$_1$-C$_8$-alkyl, —F, —Cl, and —Br;

each of R$^c$ and each of R$^d$ is independently selected from the group consisting of —H, optionally fluorinated C$_1$-C$_8$-alkyl, —F, —Cl, and —Br; and x is 0 or 1.

2. The composition according to claim 1, wherein the inhibitor (b) is represented by formula (II):

$$R^c{}_2R^aC—CO—CHR—CO—Y \quad (II),$$

or formula (III):

$$R^c{}_2R^aC—CO—CHR—CO—CR^b{}_xR^d{}_{3-x} \quad (III),$$

wherein the groups are as defined in claim 1.

3. The composition according to claim 2, containing the following components:
(a) a hydrosilylation catalyst comprising platinum(0) and olefinic ligands, and
(b) an inhibitor represented by formula (I), (II), or (III).

4. The composition according to claim 2, wherein at least one of —CR$^a$R$^c{}_2$ and —CR$^b{}_xR^d{}_{3-x}$ is —CF$_3$.

5. The composition according to claim 1, further containing the following components: (c) a sil(ox)ane having an olefinic group or a vinyl-containing polysiloxane, and (d) a sil(ox)ane containing hydrogen directly bonded to silicon or a polysiloxane containing hydrogen directly bonded to silicon.

6. The composition according to claim 1, wherein the hydrosilylation catalyst is a complex of platinum(0) and a divinyl-containing disiloxane.

7. The composition according to claim 5, wherein the weight ratio of components (b):((c)+(d)) is 3:100 to 20:100.

8. The composition according to claim 5, containing, as component (e), a solvent that does not fall within the definition of any of components (a) to (d).

9. A two-package hydrosilylation system, wherein a first package comprises a sil(ox)ane containing hydrogen directly bonded to silicon and a second package comprises the composition of claim 1 and a sil(ox)ane having an olefinic group; or wherein a first package comprises the composition of claim 1 and a sil(ox)ane containing hydrogen directly bonded to silicon and a second package comprises a sil(ox)ane having an olefinic group.

10. A process of hydrosilylation comprising the steps of
(i) providing a reaction system containing the following components:
(a) a hydrosilylation catalyst comprising a metal-ligand complex, and
(b) an inhibitor of the catalyst, wherein the inhibitor differs from the ligand of the metal-ligand complex and is represented by formula (I), (II), or (III):

$$X—CHR—CO—Y \quad (I),$$

wherein —X represents —NO$_2$, —S(=O)R, or R$^c{}_2R^aC—CO—$; Y represents 2-furyl, —S(=O)R, —CN, —NO$_2$, or —CR$^b{}_xR^d{}_{3-x}$; R$^a$ and R$^b$ are independently selected from the group consisting of —O—R, —O—CO—R, —CO—O—R, 2-furyl, —S(=O)R, —CN, —NO$_2$, —F, —Cl, and —Br; each of R is independently selected from the group consisting of —H, optionally fluorinated C$_1$-C$_8$-alkyl, —F, —Cl, and —Br; each of R$^c$ and each of R$^d$ is independently selected from the group consisting of —H, optionally fluorinated C$_1$-C$_8$-alkyl, —F, —Cl, and —Br; and x is 0 or 1;

$$R^c{}_2R^aC—CO—CHR—CO—Y \quad (II),$$

wherein the groups are as defined in relation to formula (I);

$$R^c{}_2R^aC—CO—CHR—CO—CR^b{}_xR^d{}_{3-x} \quad (III),$$

wherein the groups are as defined in relation to formula (I),
(c) a sil(ox)ane having an olefinic group, and
(d) a sil(ox)ane containing hydrogen directly bonded to silicon;
(ii) carrying out a hydrosilylation reaction to crosslink components (c) and (d); and
(iii) at least partly removing the inhibitor from the reaction system.

* * * * *